(12) United States Patent
McCaffrey et al.

(10) Patent No.: US 10,598,046 B2
(45) Date of Patent: Mar. 24, 2020

(54) SUPPORT STRAPS AND METHOD OF ASSEMBLY FOR GAS TURBINE ENGINE

(71) Applicant: United Technologies Corporation, Farmington, CT (US)

(72) Inventors: Michael G. McCaffrey, Windsor, CT (US); Scott D. Virkler, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 31 days.

(21) Appl. No.: 16/032,656

(22) Filed: Jul. 11, 2018

(65) Prior Publication Data

US 2020/0018189 A1    Jan. 16, 2020

(51) Int. Cl.
| | |
|---|---|
| *F01D 25/28* | (2006.01) |
| *F01D 5/02* | (2006.01) |
| *F01D 9/04* | (2006.01) |

(52) U.S. Cl.
CPC ............ *F01D 25/28* (2013.01); *F01D 5/027* (2013.01); *F01D 9/042* (2013.01); *F05D 2220/32* (2013.01); *F05D 2230/60* (2013.01); *F05D 2240/128* (2013.01); *F05D 2240/14* (2013.01); *F05D 2240/20* (2013.01)

(58) Field of Classification Search
None
See application file for complete search history.

(56) References Cited

U.S. PATENT DOCUMENTS

| 3,071,346 | A | | 1/1963 | Broffitt | |
|---|---|---|---|---|---|
| 3,842,595 | A | | 10/1974 | Smith et al. | |
| 4,688,745 | A | * | 8/1987 | Rosenthal | B64D 15/04 244/134 R |
| 5,273,401 | A | * | 12/1993 | Griffin | F01D 5/282 416/193 R |
| 7,503,750 | B1 | * | 3/2009 | Violette | B64C 11/06 416/134 A |
| 10,443,572 | B2 | * | 10/2019 | Thomas | F03D 13/10 |
| 2008/0229750 | A1 | * | 9/2008 | Sipson | F23R 3/60 60/734 |
| 2009/0121441 | A1 | * | 5/2009 | Miller | F01D 11/003 277/366 |
| 2013/0094951 | A1 | * | 4/2013 | McCaffrey | F01D 25/162 415/200 |
| 2016/0003079 | A1 | * | 1/2016 | Boeke | F01D 11/005 415/1 |

(Continued)

FOREIGN PATENT DOCUMENTS

| EP | 2078826 A2 | 7/2009 |
|---|---|---|
| FR | 2211591 A1 | 7/1974 |

OTHER PUBLICATIONS

European Search Report dated Dec. 6, 2019 issued for corresponding European Patent Application No. 19173938.

*Primary Examiner* — Michael Lebentritt
(74) *Attorney, Agent, or Firm* — Bachman & LaPointe, P.C.

(57) ABSTRACT

A method of assembling a portion of a gas turbine engine, includes assembling a plurality of static structure rings; attaching a plurality of support straps to an outer diameter of the plurality of static structure rings to form a cartridge; inserting the cartridge at least partially into an outer case assembly along an engine axis.

20 Claims, 15 Drawing Sheets

(56) References Cited

U.S. PATENT DOCUMENTS

| | | | |
|---|---|---|---|
| 2016/0146053 A1* | 5/2016 | McCaffrey | F01D 25/246 |
| | | | 415/173.1 |
| 2016/0186767 A1 | 6/2016 | Rautenstrauch | |
| 2016/0230673 A1* | 8/2016 | Milligan | F01D 25/246 |
| 2017/0321563 A1* | 11/2017 | LeBlanc | F01D 25/285 |
| 2017/0335720 A1* | 11/2017 | Clark | F01D 5/02 |
| 2018/0094545 A1* | 4/2018 | Dale | F01D 25/30 |
| 2018/0128119 A1* | 5/2018 | Hummel | G01M 1/36 |
| 2019/0234241 A1* | 8/2019 | Amadon | F01D 9/04 |

* cited by examiner

SUPPORT STRAPS AND METHOD OF ASSEMBLY FOR GAS TURBINE ENGINE

U.S. GOVERNMENT RIGHTS

This invention was made with Government support under contract W58RGZ-16-C-0046 awarded by the United States Army. The Government has certain rights in the invention.

BACKGROUND

The present disclosure relates generally to assembly of gas turbine engines, and more particularly to a support straps for assembly of a gas turbine engine.

Gas turbine engines include a compressor that compresses air, a combustor that burns the compressed air, and a turbine across which the combustion gases are expanded. The expansion of the combustion gases drives the turbine, which in turn drives rotation of a power turbine and the compressor.

An engine outer case assembly may include plurality case modules connected by flanges. A reduction in the number of modules necessarily reduces weight thereof. The assembly may utilize axial stacking inside the outer case so that the rotor can be balanced during assembly. However, integrating case modules complicates assembly and rotor installation.

SUMMARY

A method of assembling a portion of a gas turbine engine according to one disclosed non-limiting embodiment of the present disclosure includes assembling a plurality of static structure rings; attaching a plurality of support straps to an outer diameter of the plurality of static structure rings to form a cartridge; and inserting the cartridge at least partially into an outer case assembly along an engine axis.

A further aspect of the present disclosure includes that at least one of the plurality of static structure rings comprises a vane ring.

A further aspect of the present disclosure includes that at least one of the plurality of static structure rings comprises a shroud.

A further aspect of the present disclosure includes that attaching the plurality of support straps comprises attaching each of the plurality of support straps parallel to the engine axis.

A further aspect of the present disclosure includes that attaching the plurality of support straps comprises attaching each of the plurality of support straps to an anti-rotation feature on at least two of the plurality of static structure rings.

A further aspect of the present disclosure includes that attaching the plurality of support straps comprises attaching each of the plurality of support straps through an aperture in an anti-rotation feature on at least two of the plurality of static structure rings.

A method of assembling a portion of a gas turbine engine according to one disclosed non-limiting embodiment of the present disclosure includes forming a cartridge of a plurality of axially assembled components with a plurality of support straps and inserting the cartridge at least partially into an outer case assembly along an engine axis.

A further aspect of the present disclosure includes stacking a first, a second, a third, and a fourth static structure ring; and attaching the plurality of support straps to an outer diameter of the first static structure ring and the fourth static structure ring to form the cartridge.

A further aspect of the present disclosure includes that the first and the third static structure rings are vane rings.

A further aspect of the present disclosure includes that the second and the fourth static structure rings each comprise shroud rings.

A further aspect of the present disclosure includes forming the cartridge comprises installing a rotor within the first, the second, the third, and the fourth static structure rings.

A further aspect of the present disclosure includes installing a rotor within the first, the second, the third, and the fourth static structure rings.

A further aspect of the present disclosure includes attaching the plurality of support straps comprises attaching each of the plurality of support straps parallel to an engine axis.

A further aspect of the present disclosure includes attaching the plurality of support straps comprises attaching each of the plurality of support straps through an aperture in an anti-rotation feature on the first static structure ring and an aperture in an anti-rotation feature on the fourth static structure ring.

A gas turbine engine according to one disclosed non-limiting embodiment of the present disclosure includes a first static structure ring; a second static structure ring adjacent to the first static structure ring; a support strap attached to the first static structure ring and the second static structure ring to form a cartridge; and an outer case assembly that at least partially surrounds the cartridge.

A further aspect of the present disclosure includes that the first static structure ring comprises a first anti-rotation feature and the second static structure ring comprises a second anti-rotation feature, the support strap attached to the first anti-rotation feature and the second anti-rotation feature.

A further aspect of the present disclosure includes that the first static structure ring comprises a first anti-rotation feature and the second static structure ring comprises a second anti-rotation feature, the support strap at least partially extends through a first aperture in the first anti-rotation feature and a second aperture in the second anti-rotation feature.

A further aspect of the present disclosure includes that the support strap comprises a first tab in a first end section and a second tab in a second end section.

A further aspect of the present disclosure includes that the support strap forms an arc between the first end section and the second end section.

A further aspect of the present disclosure includes that the outer case assembly is a mid-turbine frame with integral power turbine case.

A further aspect of the present disclosure includes that the second static structure ring and the first static structure ring contain a balanced bladed rotor disk.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
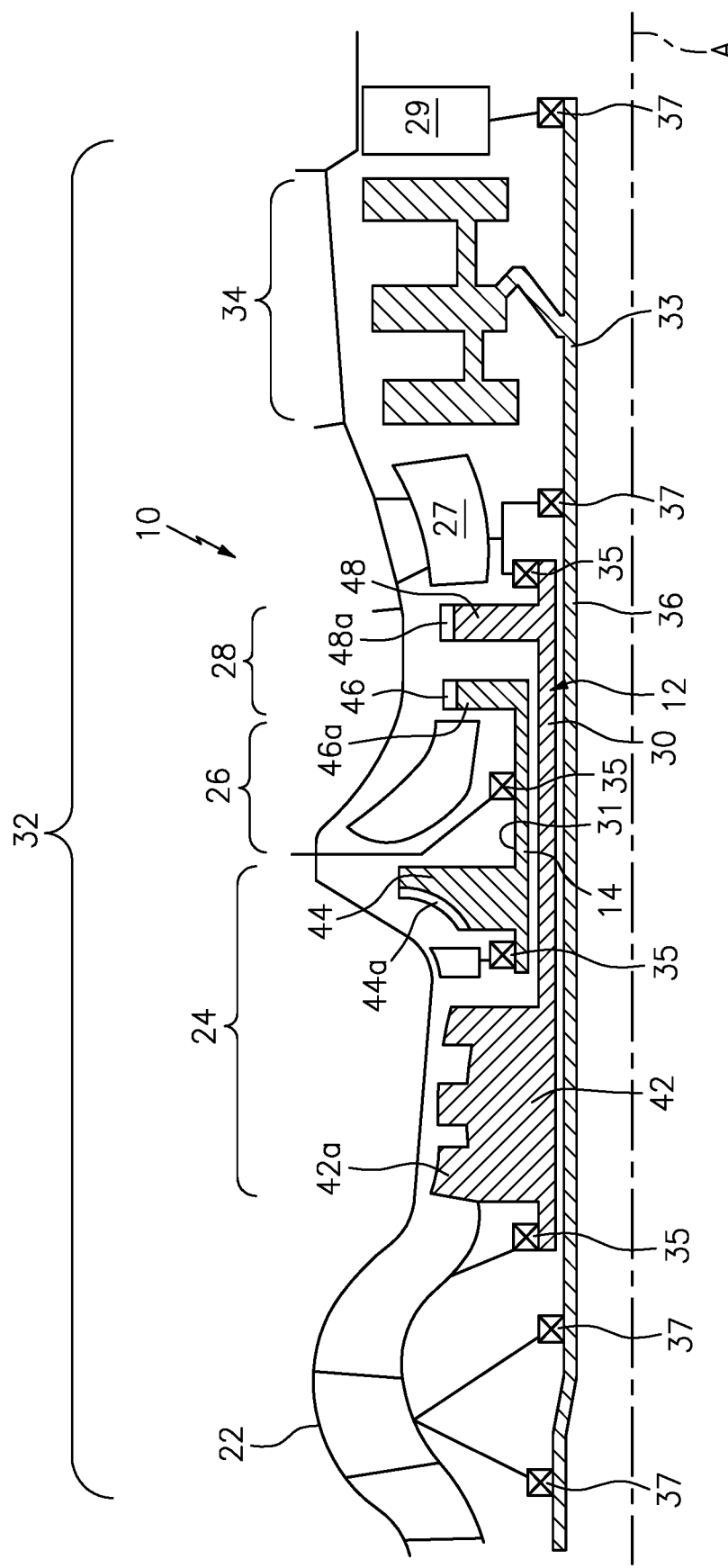
FIG. 1 illustrates an example turboshaft gas turbine engine.

FIG. 1 schematically illustrates a gas turbine engine 10. In this embodiment, the engine 10 is a three-spool turboshaft engine, such as for a helicopter with a low spool 12, a high spool 14 and a power turbine spool 33 mounted for rotation about an engine central longitudinal axis A. The engine 10 includes an inlet duct 22, a compressor section 24, a combustor section 26, a turbine section 28, and a power turbine section 34.

The compressor section 24 includes a low pressure compressor 42 with a multitude of circumferentially-spaced blades 42a and a centrifugal high pressure compressor 44 a multitude of circumferentially-spaced blades 44a. The turbine section 28 includes a high pressure turbine 46 with a multitude of circumferentially-spaced turbine blades 46a and a low pressure turbine 48 with a multitude of circumferentially-spaced blades 48a. The low spool 12 includes an inner shaft 30 that interconnects the low pressure compressor 42 and the low pressure turbine 48. The high spool 14 includes an outer shaft 31 that interconnects the high pressure compressor 44 and the high pressure turbine 46.

The low spool 12 and the high spool 14 are mounted for rotation about the engine central longitudinal axis A relative to an engine static structure 32 via several bearing systems 35. The power turbine spool 33 is mounted for rotation about the engine central longitudinal axis A, relative to the engine static structures 22, 27, and 29 via several bearing systems 37.

The compressor section 24 and the turbine section 28 drive the power turbine section 34 that drives an output shaft 36. In this example engine, the compressor section 24 has five stages, the turbine section 28 has two stages and the power turbine section 34 has three stages. During operation, the compressor section 24 draws air through the inlet duct 22. In this example, the inlet duct 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28 which rotationally drives the compressor section 24. The hot gas stream exiting the turbine section 28 further expands and drives the power turbine section 34 and the output shaft 36. The compressor section 24, the combustor section 26, and the turbine section 28 are often referred to as the gas generator, while the power turbine section 34 and the output shaft 36 are referred to as the power section. Although not shown, the main shaft 30 may also drive a generator or other accessories through an accessory gearbox. The gas generator creates the hot expanding gases to drive the power section. Depending on the design, the engine accessories may be driven either by the gas generator or by the power section. Typically, the gas generator and power section are mechanically separate such that each rotate at different speeds appropriate for the conditions, referred to as a 'free power turbine.'

Figure 2:
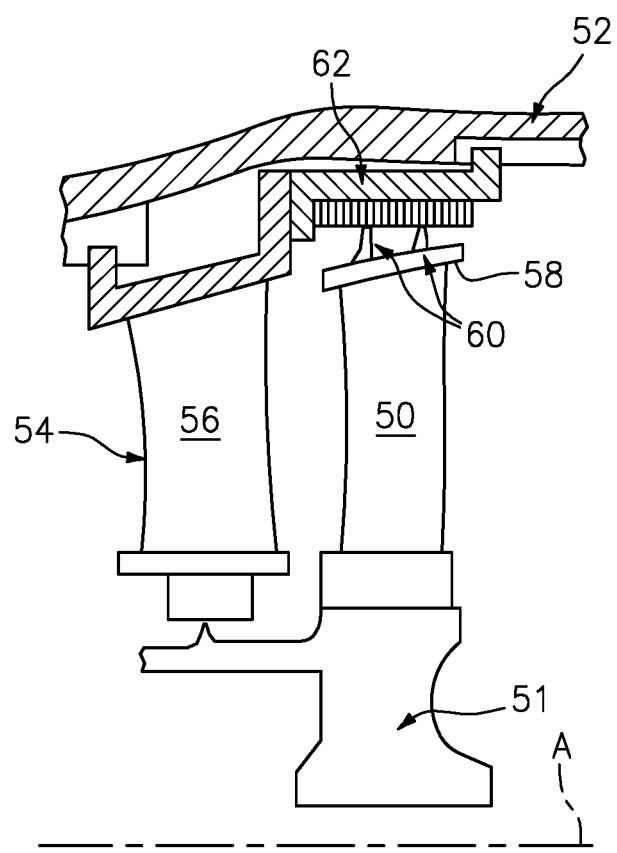
FIG. 2 illustrates a stage of the gas turbine engine.

FIG. 2 illustrates an engine stage of the gas turbine engine 10. In this example, the engine stage represents a portion of the power turbine 34. However, it should be appreciated that other engine sections and architectures will benefit herefrom. In this example, a blade 50 such as the turbine blade (only one shown, although a plurality of blades are circumferentially disposed about a rotor disk 51) is mounted for rotation relative to an outer case assembly 52 of the static structure 32. The engine stage 40 also includes a vane ring 54 supported within the outer case assembly 52 upstream from the blade 50. The vane ring 54 contains one or more vanes 56 that prepare the airflow for the blades.

The blade 50 includes a blade tip 58 that is located at a radially outermost portion of the blade 50. The blade tip 58 includes a knife edge 60 that extends toward a shroud 62. The shroud 62 establishes an outer radial flow path boundary of the core flow path. The knife edge 60 and the shroud 62 cooperate to limit airflow leakage around the blade tip 58. The shroud 62 is disposed in an annulus radially between the outer case assembly 52 and the blade tip 58.

Figure 3:
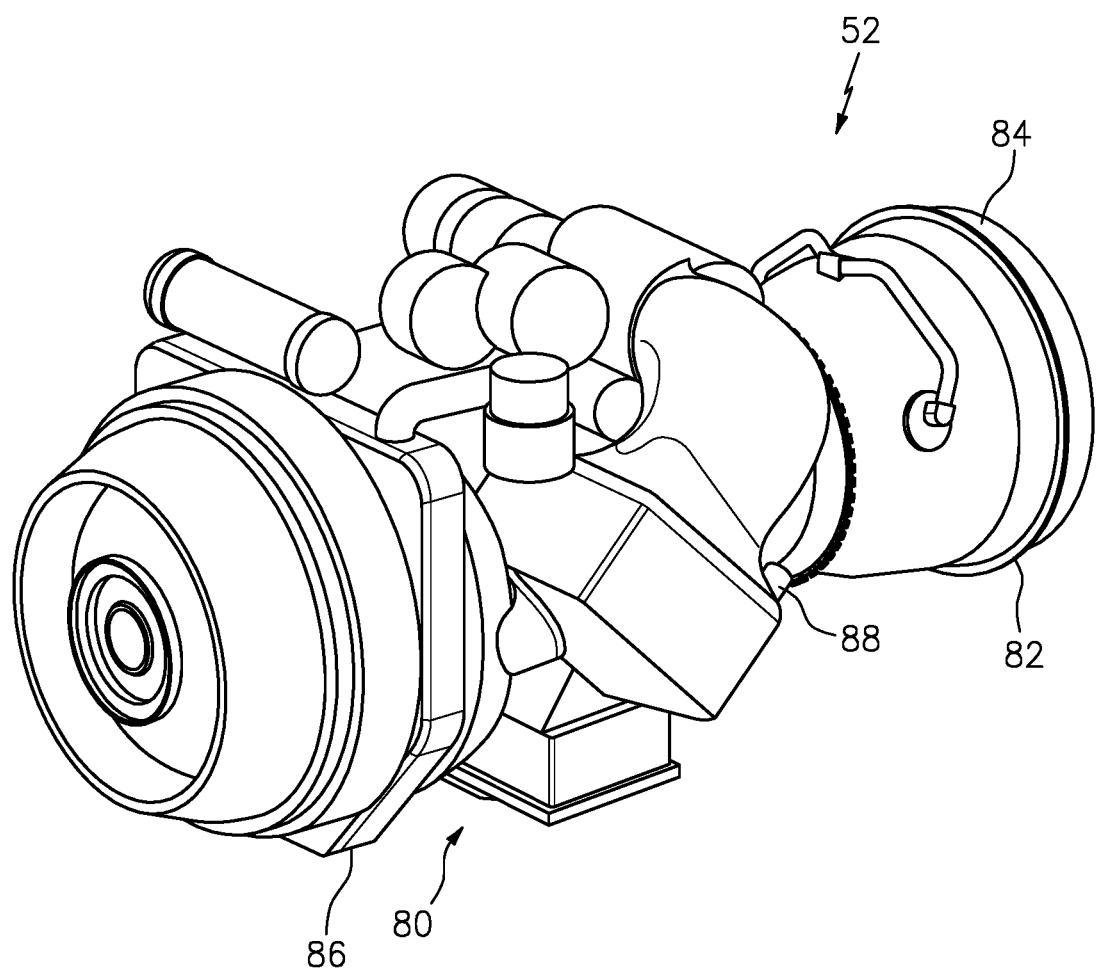
FIG. 3 illustrates an outer case assembly for the gas turbine engine.
Figure 4:
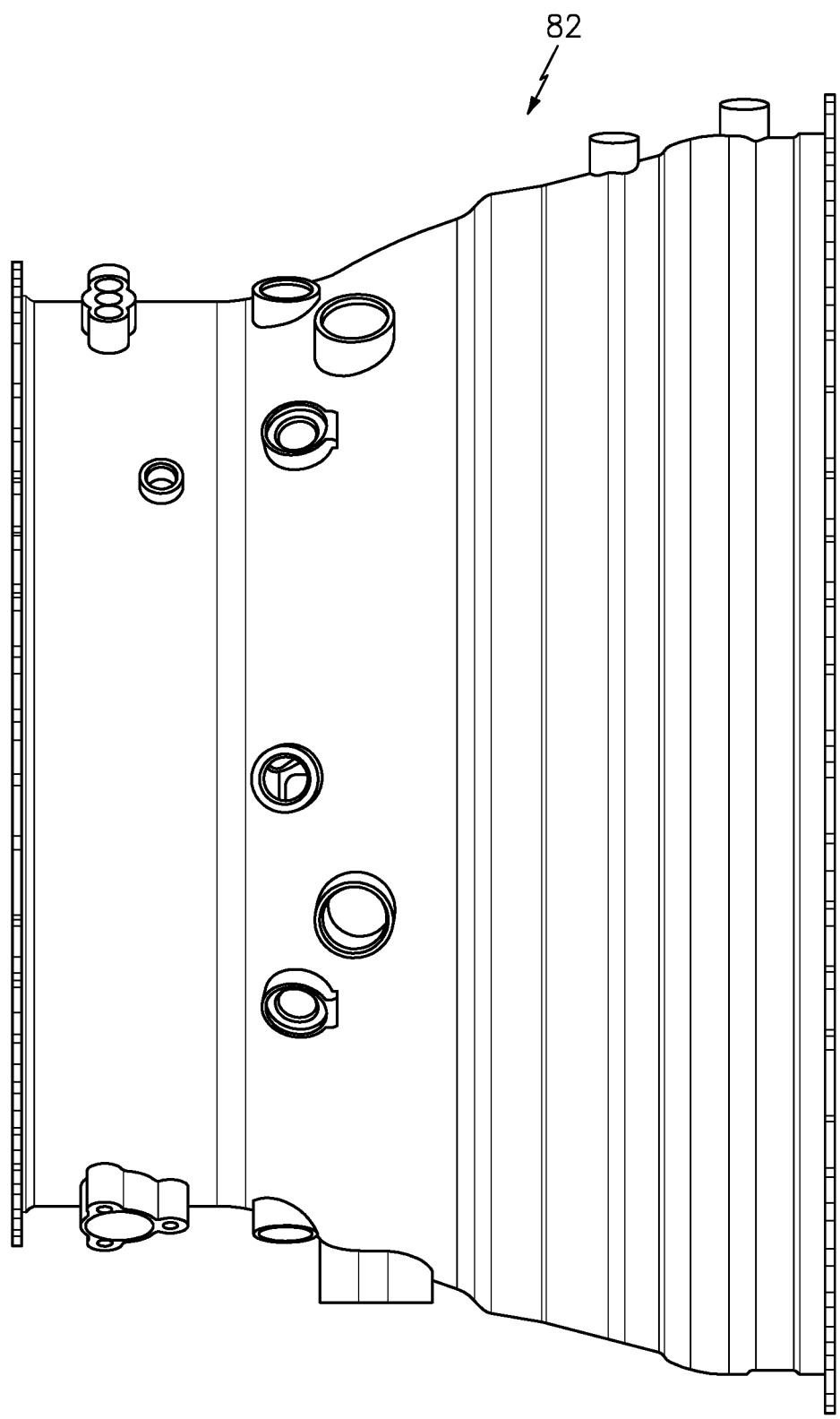
FIG. 4 illustrates a mid-turbine frame with integral power turbine case according to one disclosed non-limiting embodiment.

With reference to FIG. 3, the outer case assembly 52 includes a plurality of outer case modules 80. In this illustrated embodiment, the plurality of case modules 80 can include a mid-turbine frame with integral power turbine case 82 (also shown in FIG. 4) with a turbine exhaust case 84 aft thereof, and one or more cases forward thereof such as an inlet compressor case 86, and diffuser case 88. It should be appreciated that additional or alternative modules might be utilized to form the engine case assembly 52 and the assembly may be utilized in other engine sections such as the compressor section 24, the turbine section 28, or other section.

The mid-turbine frame with integral power turbine case 82 eliminates the weight and potential leakage path of at least one bolted flange. The mid-turbine frame with integral power turbine case 82, however, requires an assembly method that permits, for example, a power turbine rotor and stator assembly 90 (FIG. 5) to be assembled outside of the mid-turbine frame with integral power turbine case 82 as a cartridge, then be installed along the engine longitudinal axis A.

Figure 5:
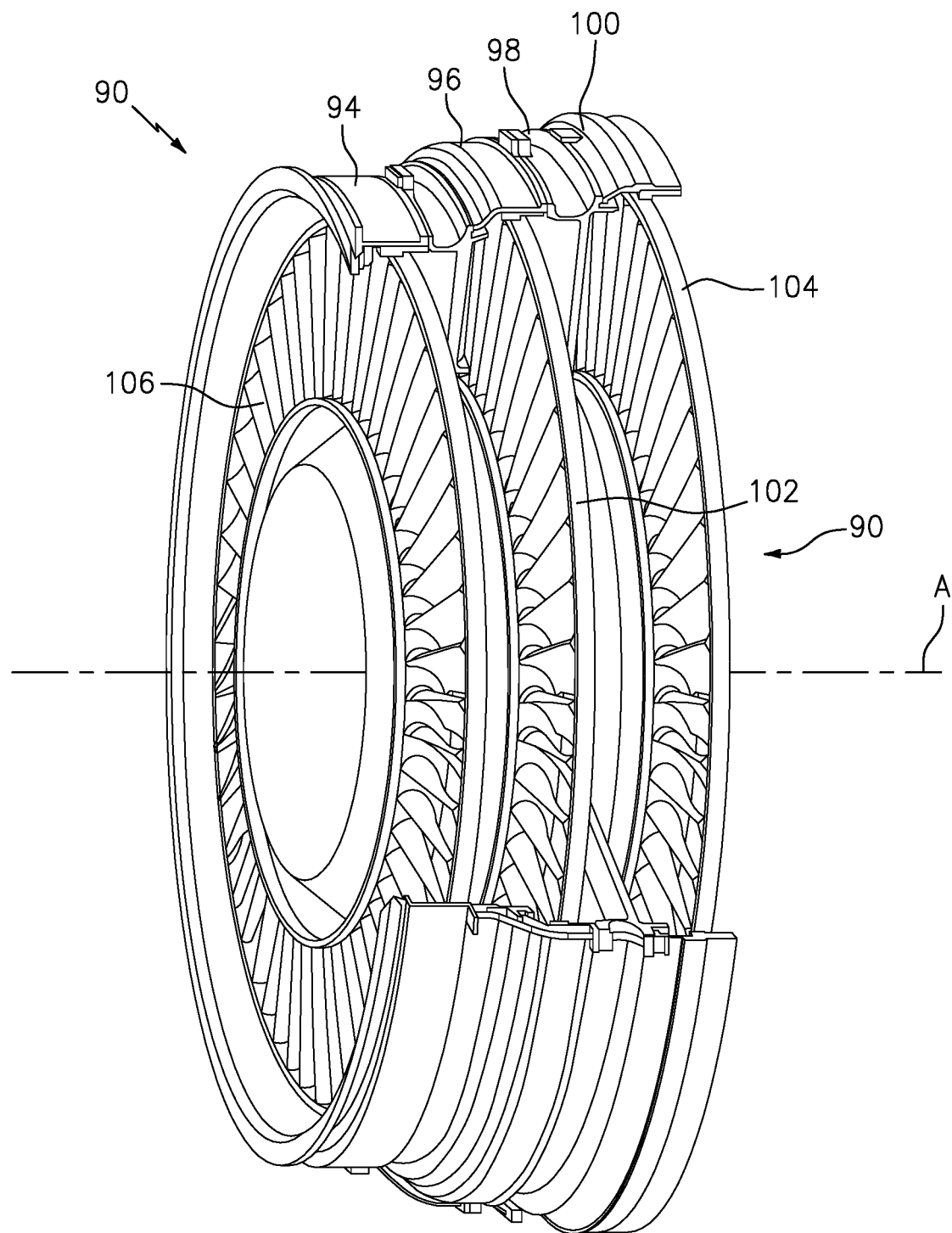
FIG. 5 illustrates a partial sectional view of the plurality of static structure rings and rotors received within the mid-turbine frame with integral power turbine case.
Figure 6:
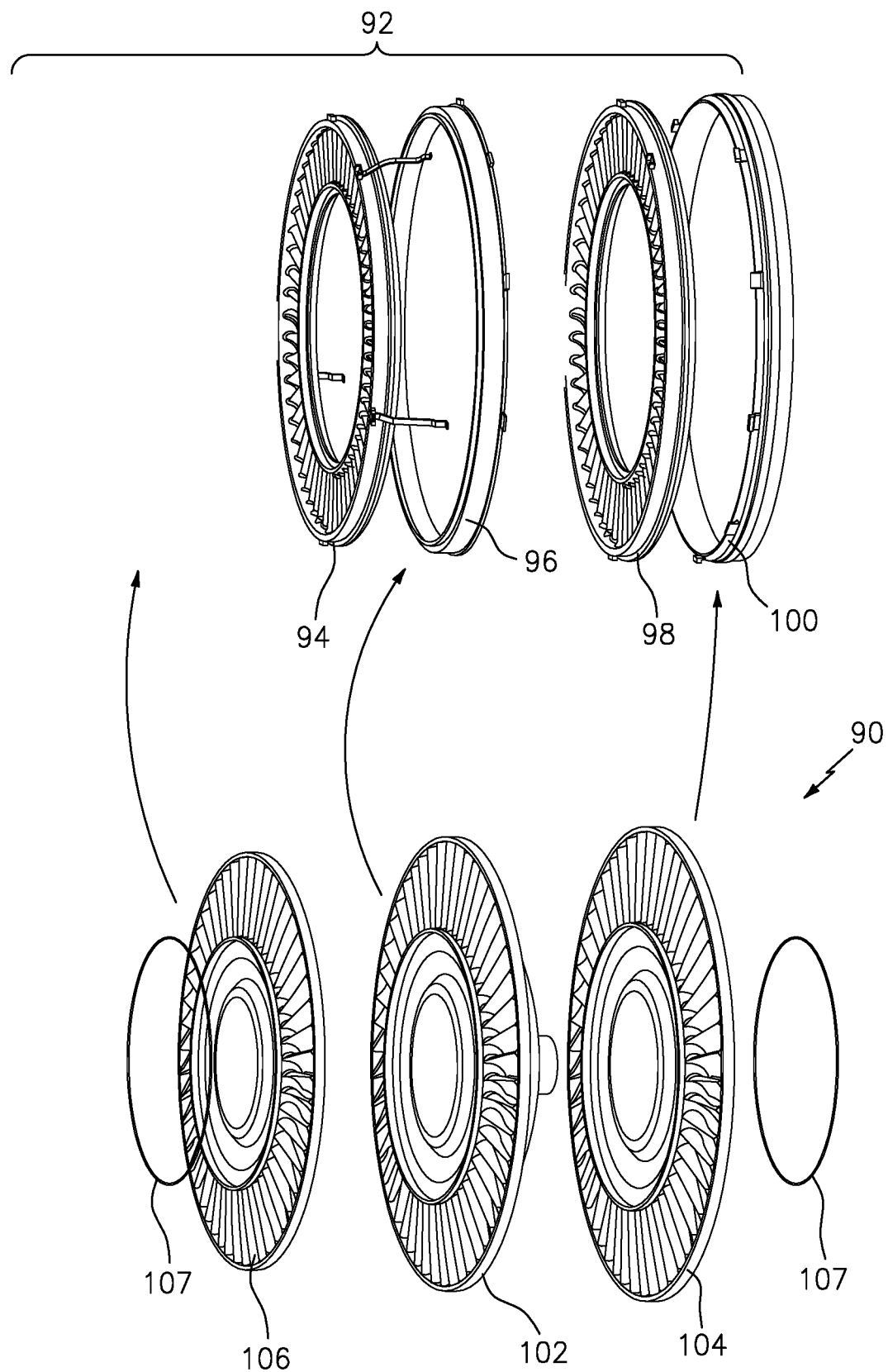
FIG. 6 is an exploded view of the plurality of static structure rings and rotors received within the mid-turbine frame with integral power turbine case.
Figure 7:
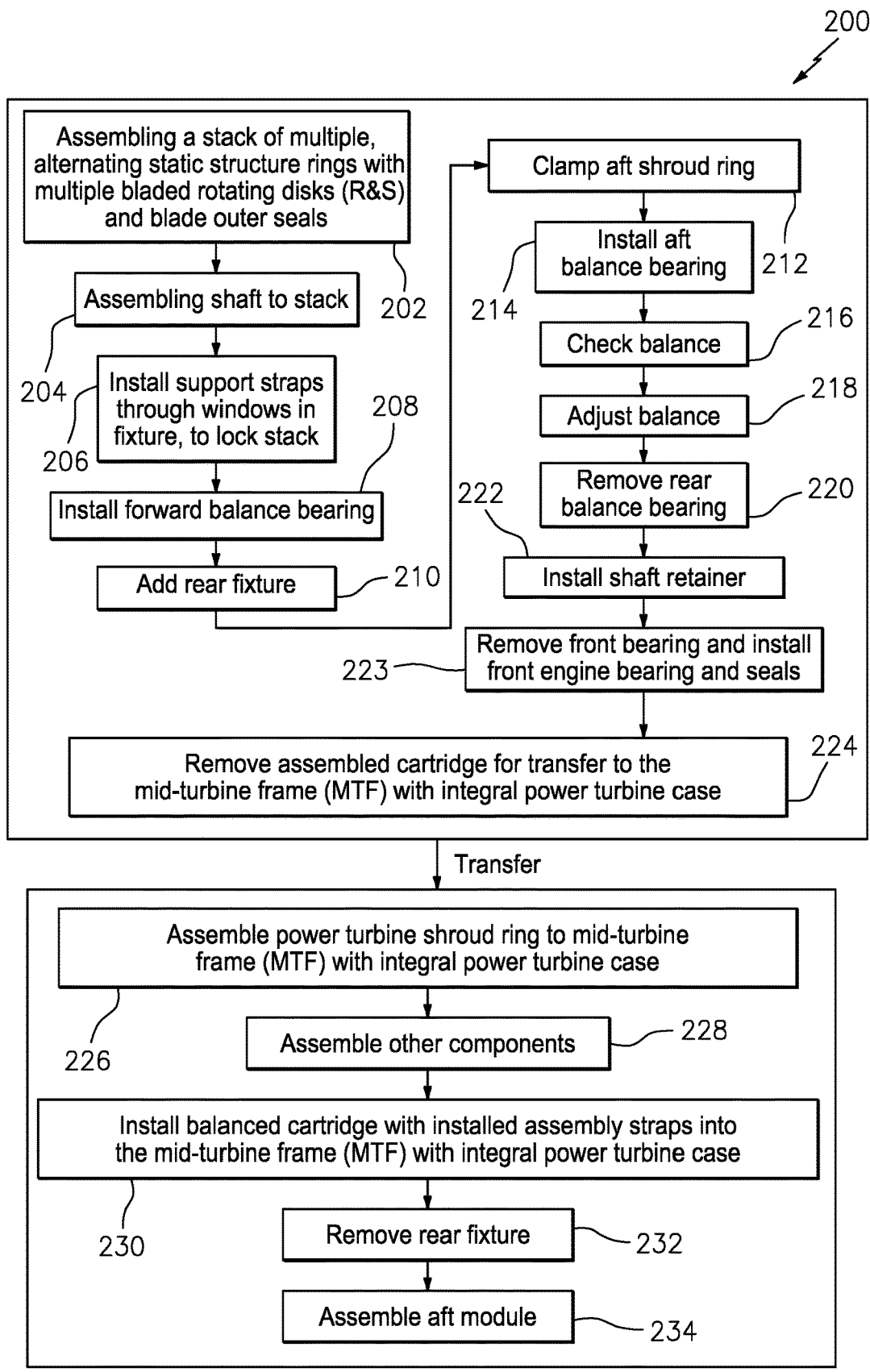
FIG. 7 illustrates a method of assembling the gas turbine engine with the plurality of support straps.

With reference to FIGS. 5 and 6, the power turbine rotor and stator assembly 90 generally includes a plurality of static structure rings 92. The plurality of static structure rings 92 in this example, may include a stack of a first vane ring 94, a second shroud ring 96, a third vane ring 98, and a fourth shroud ring 100 (FIG. 7). The shroud rings 96, 100 include shrouds to surround a respective rotor 102, 104. The plurality of static structure rings 92 may include alternative or additional structures in the stack.

Figure 8:
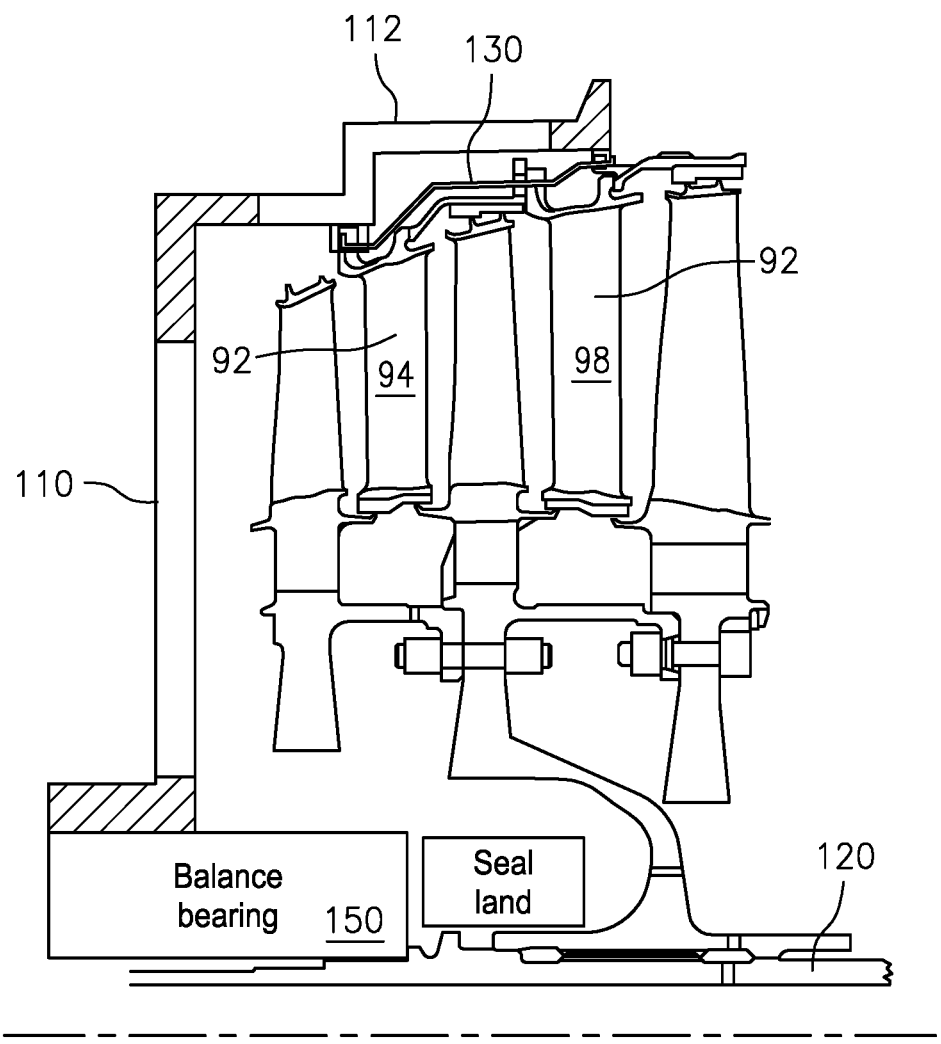
FIG. 8 illustrates a step of assembling the plurality of static structure rings and rotors as a cartridge to be received within the mid-turbine frame with integral power turbine case.

With reference to FIG. 7, a method 200 for assembly of the power turbine rotor and stator assembly 90 initially includes assembling (step 202; FIG. 8) the plurality of static structure rings 92 alternating with bladed rotating disks and shrouds as a stack within a forward fixture 110. Next, a power turbine shaft assembly 120 is assembled to the stack (step 204).

Figure 9:
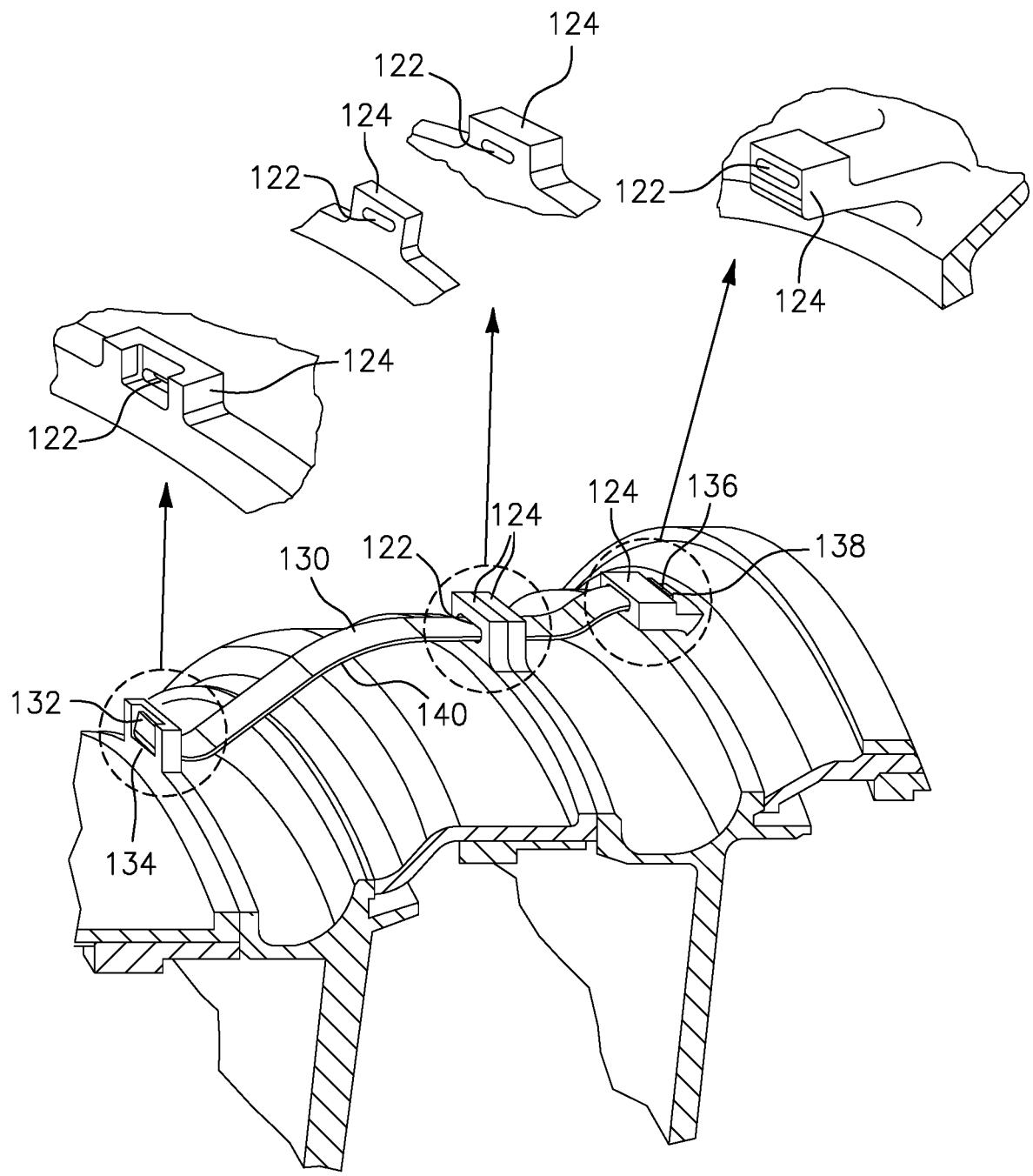
FIG. 9 illustrates one of the support straps mounted to the cartridge.
Figure 10:
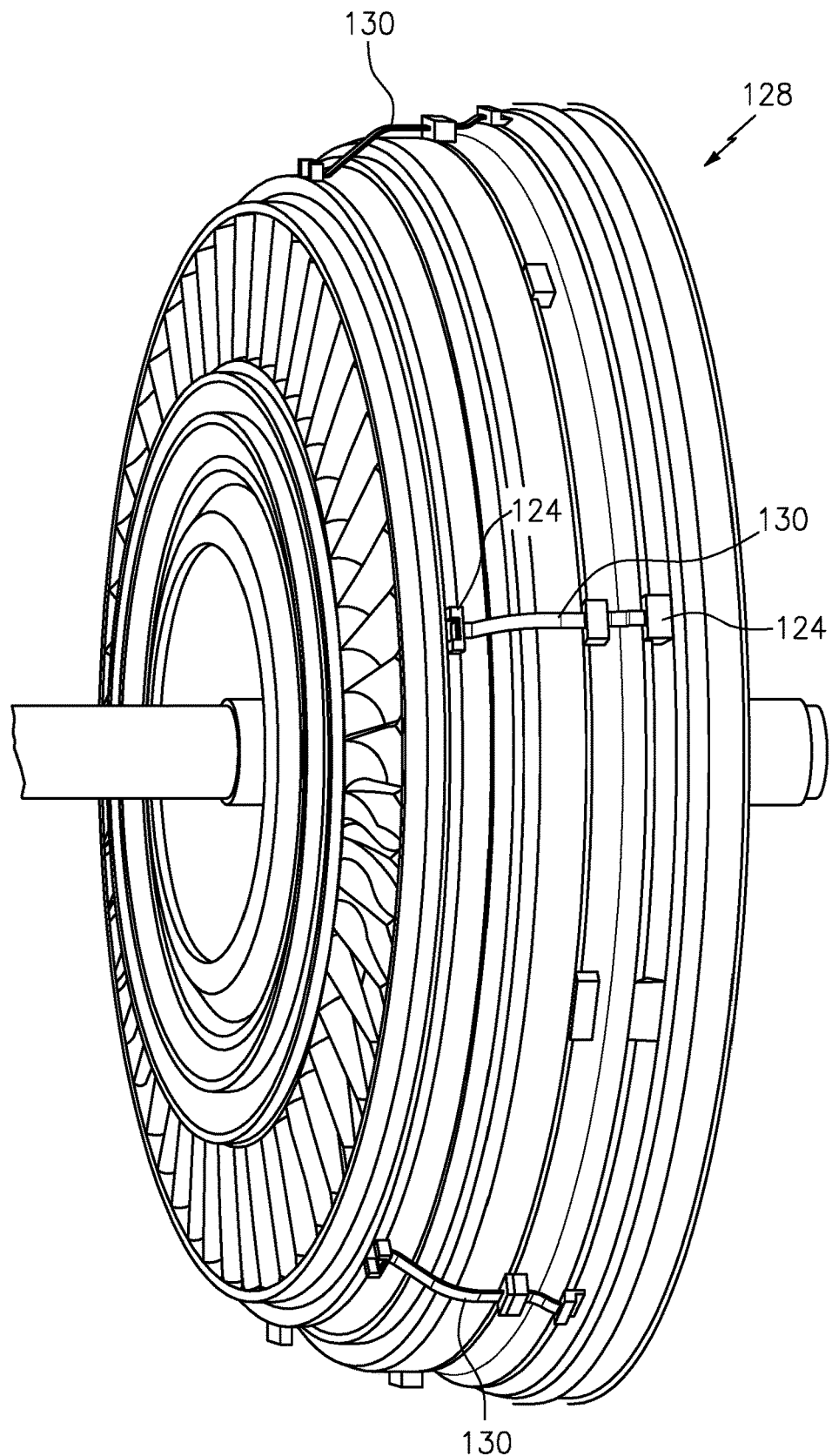
FIG. 10 illustrates a perspective view of the cartridge.

Next, a plurality of support straps 130 (also shown in FIG. 9) are attached (step 206) to an outer diameter of the plurality of static structure rings 92 to form a cartridge 128 (also shown in FIG. 10). The support straps 130 axially lock together the plurality of static structure rings 92. Access to the plurality of static structure rings 92 may be through a plurality of windows 112 in the forward fixture 110 which is often referred to as a "wagon wheel."

The support straps 130 are then installed through a respective aperture 122 in each anti-rotation feature 124 (FIG. 9) located on the outer diameter of each of the first vane ring 94, the second shroud ring 96, the third vane ring 98, and the fourth shroud ring 100. The anti-rotation features 124 position the plurality of static structure rings 92 within the engine case assembly 52. The support straps 130 extend generally parallel to the engine axis A and may include, for example five (5) straps arranged around the outer diameter thereof (FIG. 10). By engaging the support straps 130 through each anti-rotation feature 124, the support straps 130 lock together the static structure rings 92. Although an anti-rotation feature 124 is disclosed in the illustrated embodiment, other external features such as lugs may be alternatively or additionally be utilized. Further, presently existing external features may be modified to include an aperture 122 that receives the respective support strap 130.

The support straps 130 may be manufactured of Inconel or other high temperature resistant material. Each support strap 130 may be formed with a first tab 132 in a first end section 134 and a second tab 136 in a second end section 138 and an arc 140 between the first end section 134 and the second end section 138 (FIG. 9) once installed. The tabs 132, 136 may be bent during installation. The support straps 130 need not have any function during engine operation and may move radially with the plurality of static structure rings 92 during thermal transients. Further, no path to the core flowpath exists should the support strap 130 fracture.

Once the support straps 130 are installed and the tabs 132, 136 are bent to lock each the support straps 130 in place, a forward balance bearing 150 (step 208; FIG. 8) is installed to the first fixture 110 to receive the cartridge 128.

Figure 11:
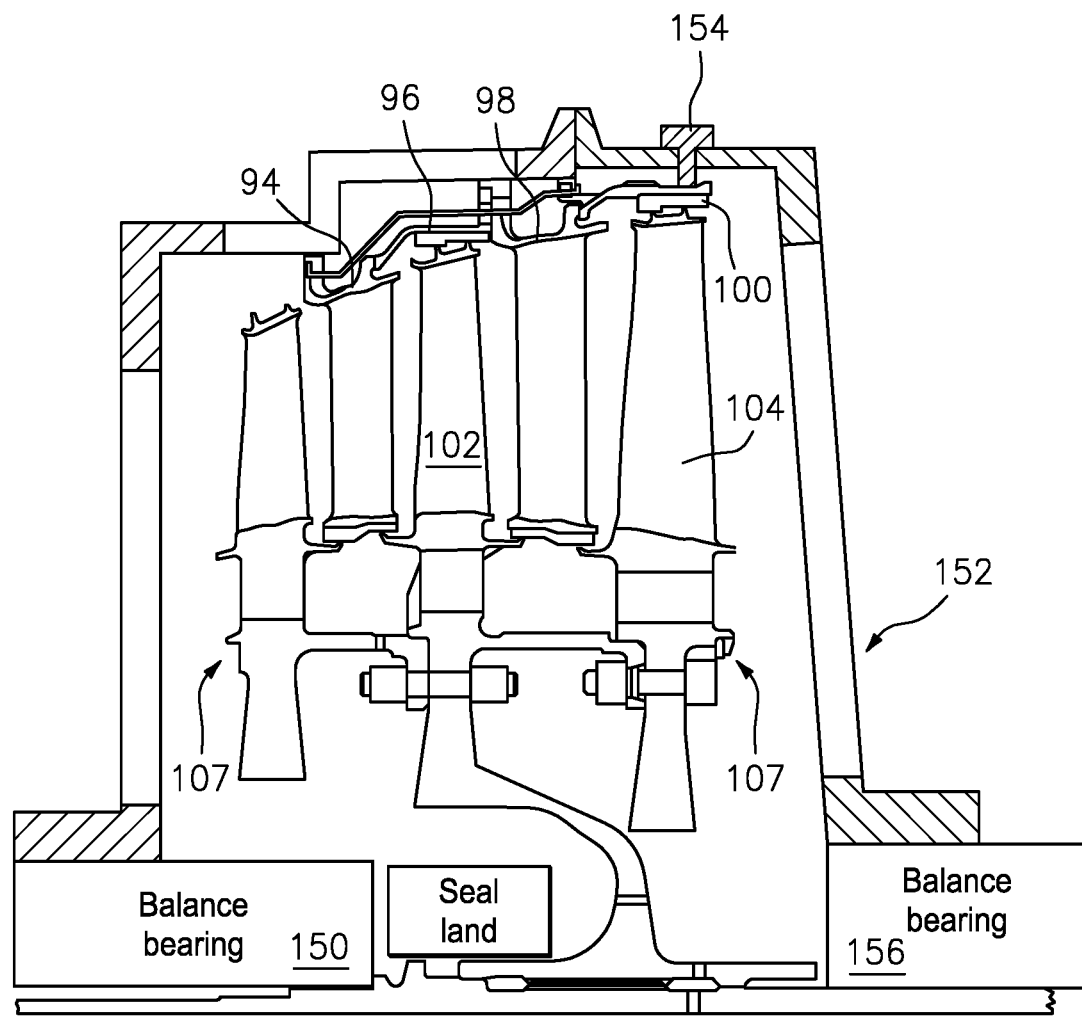
FIG. 11 illustrates a step of assembling the plurality of static structure rings and rotors as a cartridge to be received within the mid-turbine frame with integral power turbine case.

Next, a rear fixture 152 is assembled (step 210; FIG. 11) to the cartridge 128 and the forward fixture 110. The rear fixture 152 is then clamped (step 212; FIG. 11) to the fourth shroud ring 100 via clamps 154.

Next, an aft balance bearing 156 is installed (step 214; FIG. 11) to the rear fixture 110.

The cartridge 128 may then be balance checked (step 216; FIG. 11). The balance may be adjusted through, for example, removal, trim, and reinstallation of balance rings 107 (FIG. 6) as required (step 218). Access windows in the fixtures 110, 152 permit the balance rings to be removed and reinstalled.

Figure 12:
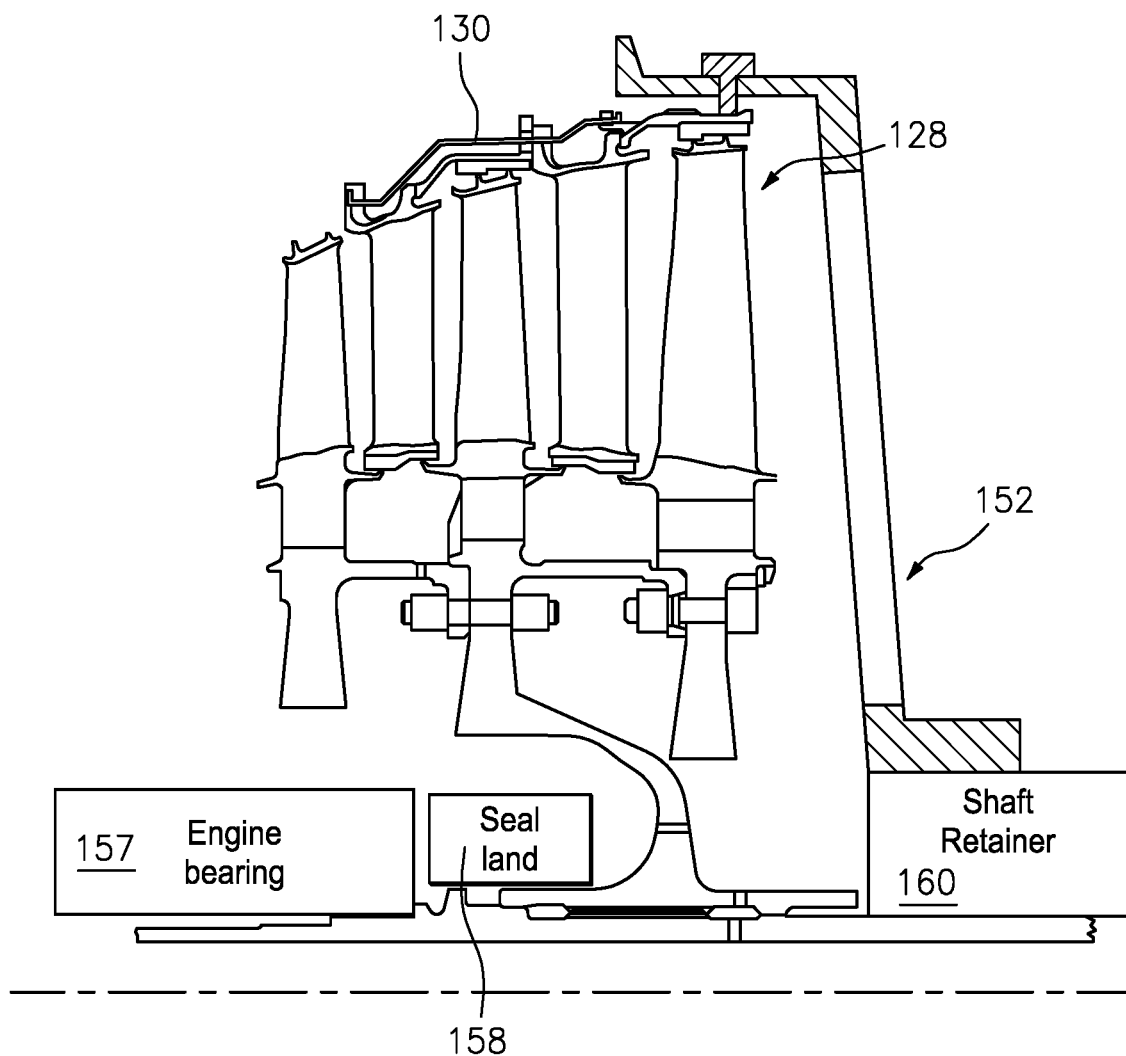
FIG. 12 illustrates a step of assembling the plurality of static structure rings and rotors as a cartridge to be received within the mid-turbine frame with integral power turbine case.
Figure 13:
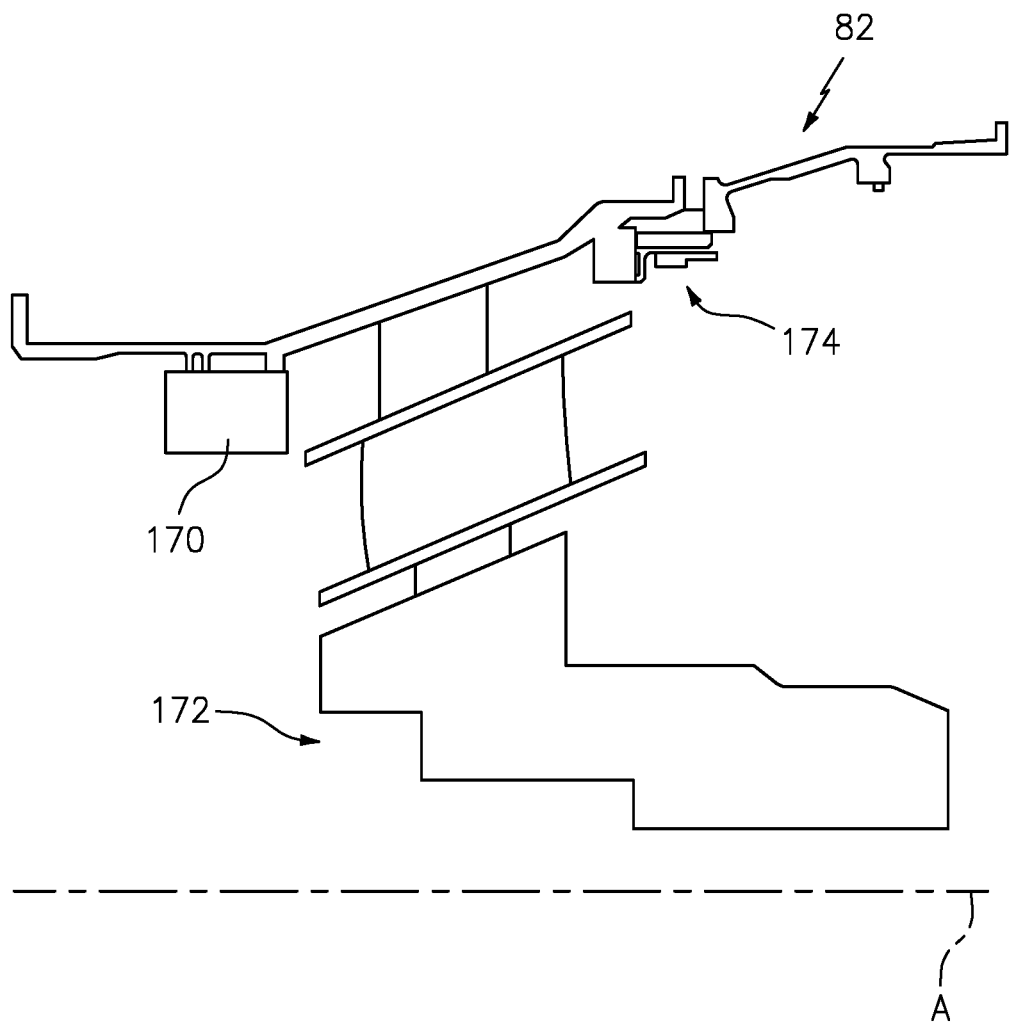
FIG. 13 illustrates a step of assembling the mid-turbine frame with integral power turbine case.

Once balanced, the rear balance bearing 156 is removed (step 220; FIG. 12) and a shaft retainer 160 is installed (step 222; FIG. 12). The balanced cartridge 128 is then removed from the forward fixture 110 then the front balance bearing 150 is removed and the engine bearing 157 and seal 158 are added to the shaft 120. The balanced cartridge 128 is then transferred (step 224; FIG. 13) to the mid-turbine frame with integral power turbine case 82. It should be appreciated that although certain primary steps are disclosed, other steps and/or component assembly and disassembly may also be required but are not specifically disclosed in this illustrated embodiment.

In one example, the mid-turbine frame with integral power turbine case 82 initially receives a power turbine shroud shroud ring 174 assembled into the mid-turbine frame with integral power turbine case 82 (step 228; FIG. 13).

Figure 14:
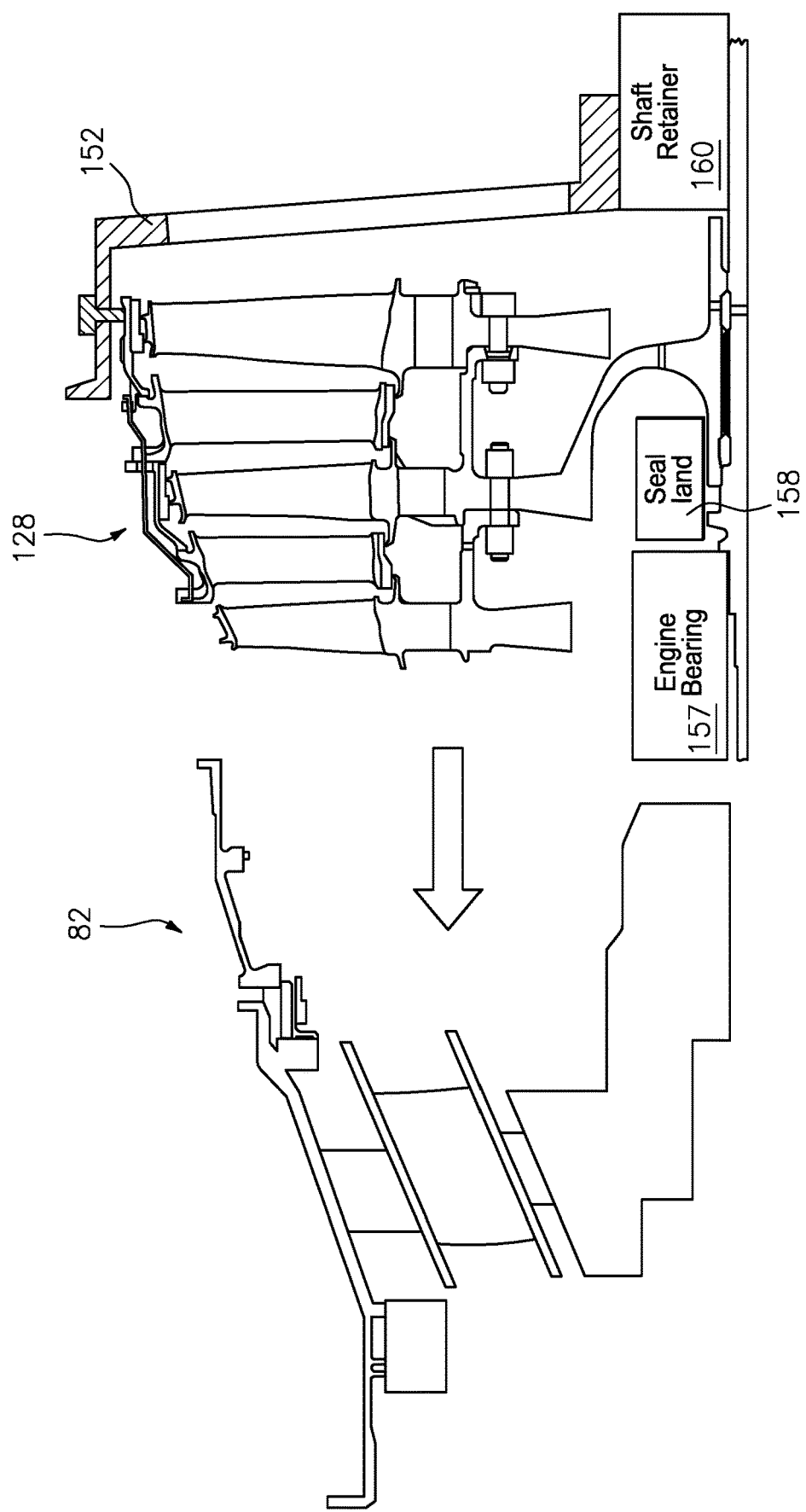
FIG. 14 illustrates a step of assembling the cartridge into the mid-turbine frame with integral power turbine case.
Figure 15:
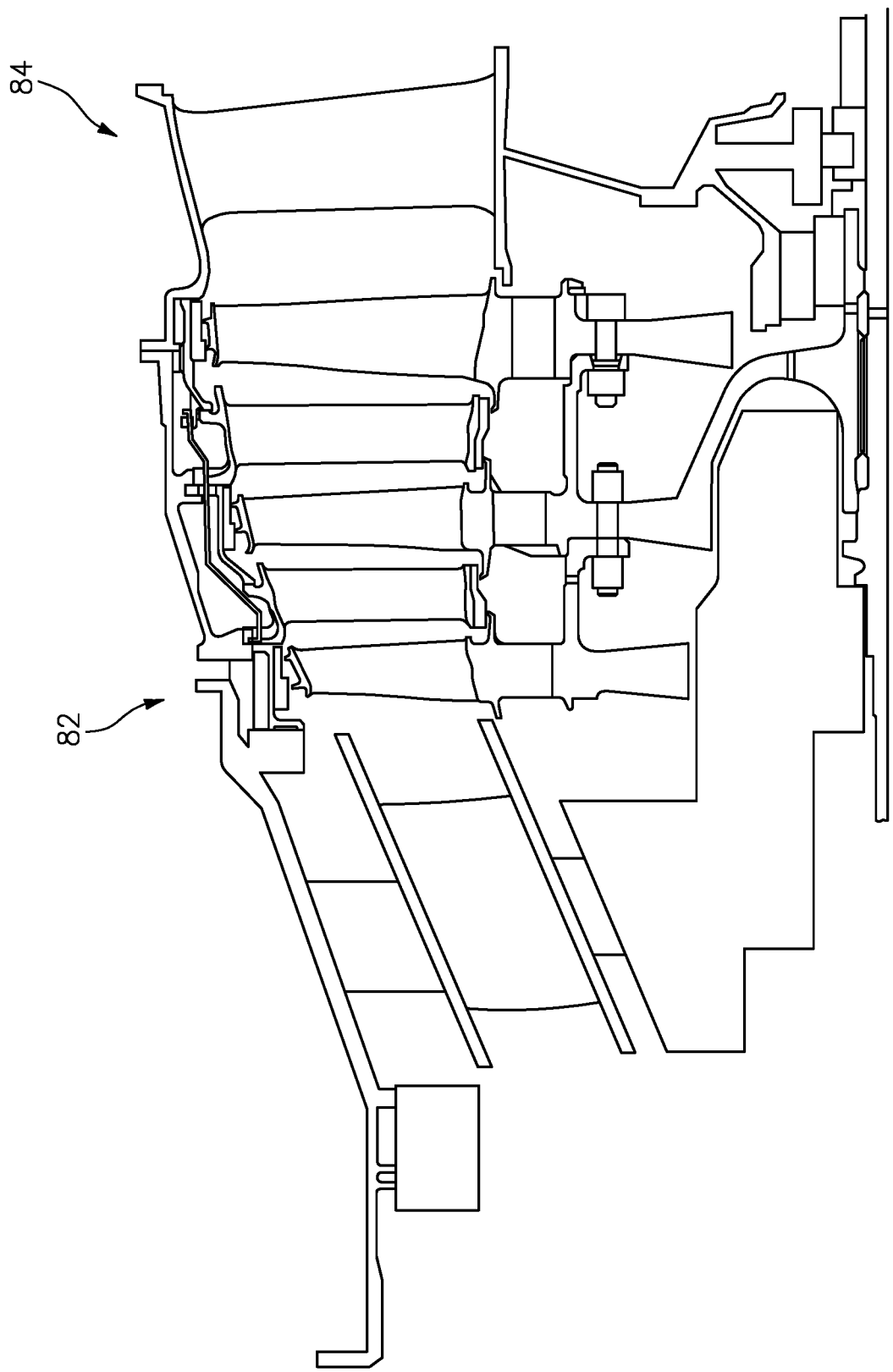
FIG. 15 illustrates the cartridge assembled into the mid-turbine frame with integral power turbine case.

Next, the balanced cartridge 128 (shown in FIG. 14) with the support straps 130 in place is then installed into the mid-turbine frame with integral power turbine case 82 (step 230). The rear fixture 152 may then be removed (step 232) once the balanced cartridge 128 is installed into the mid-turbine frame with integral power turbine case 82. Finally, an aft module such as the turbine exhaust case 84, is assembled (step 234; FIG. 15) to the mid-turbine frame with integral power turbine case 82. Various other components may be assembled thereto as well.

The support straps 130 thereby readily facilitate configuration of the cartridge 128 and thus insertion and removal from the integrated case module. Typically, the support straps 130 are discarded after a single use due to the requirement to bend the tab at assembly.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

The elements described and depicted herein, including in flow charts and block diagrams throughout the figures may show logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A method of assembling a portion of a gas turbine engine, comprising:
    assembling a plurality of static structure rings;
    attaching a plurality of support straps to an outer diameter of the plurality of static structure rings to form a cartridge; and
    inserting the cartridge at least partially into an outer case assembly along an engine axis.

2. The method as recited in claim 1, wherein at least one of the plurality of static structure rings comprises a vane ring.

3. The method as recited in claim 1, wherein at least one of the plurality of static structure rings comprises a shroud.

4. The method as recited in claim 1, wherein attaching the plurality of support straps comprises attaching each of the plurality of support straps parallel to the engine axis.

5. The method as recited in claim 1, wherein attaching the plurality of support straps comprises attaching each of the plurality of support straps to an anti-rotation feature on at least two of the plurality of static structure rings.

6. The method as recited in claim 1, wherein attaching the plurality of support straps comprises attaching each of the plurality of support straps through an aperture in an anti-rotation feature on at least two of the plurality of static structure rings.

7. A method of assembling a portion of a gas turbine engine, comprising:
    forming a cartridge of a plurality of axially assembled components with a plurality of support straps; and
    inserting the cartridge at least partially into an outer case assembly along an engine axis.

8. The method as recited in claim 7, wherein forming the cartridge comprises:
    stacking a first, a second, a third, and a fourth static structure ring; and
    attaching the plurality of support straps to an outer diameter of the first static structure ring and the fourth static structure ring to form the cartridge.

9. The method as recited in claim 8, wherein the first and the third static structure rings are vane rings.

10. The method as recited in claim 9, wherein the second and the fourth static structure rings each comprise shroud rings.

11. The method as recited in claim 10, wherein forming the cartridge comprises installing a rotor within the first, the second, the third, and the fourth static structure rings.

12. The method as recited in claim 7, wherein attaching the plurality of support straps comprises attaching each of the plurality of support straps parallel to an engine axis.

13. The method as recited in claim 7, wherein attaching the plurality of support straps comprises attaching each of the plurality of support straps through an aperture in an anti-rotation feature on the first static structure ring and an aperture in an anti-rotation feature on the fourth static structure ring.

14. A gas turbine engine, comprising:
    a first static structure ring;
    a second static structure ring adjacent to the first static structure ring;
    a support strap attached to the first static structure ring and the second static structure ring to form a cartridge; and
    an outer case assembly that at least partially surrounds the cartridge.

15. The gas turbine engine as recited in claim 14, wherein the first static structure ring comprises a first anti-rotation feature and the second static structure ring comprises a second anti-rotation feature, the support strap attached to the first anti-rotation feature and the second anti-rotation feature.

16. The gas turbine engine as recited in claim 14, wherein the first static structure ring comprises a first anti-rotation feature and the second static structure ring comprises a second anti-rotation feature, the support strap at least partially extends through a first aperture in the first anti-rotation feature and a second aperture in the second anti-rotation feature.

17. The gas turbine engine as recited in claim 14, wherein the support strap comprises a first tab in a first end section and a second tab in a second end section.

18. The gas turbine engine as recited in claim 17, wherein the support strap forms an arc between the first end section and the second end section.

19. The gas turbine engine as recited in claim 14, wherein the outer case assembly is a mid-turbine frame with integral power turbine case.

20. The gas turbine engine as recited in claim 14, wherein the second static structure ring and the first static structure ring contain a balanced bladed rotor disk.

* * * * *